Patented Mar. 3, 1936

2,032,502

UNITED STATES PATENT OFFICE 2,032,502

POLYMETHINE DYES CONTAINING A PYRAZOLONE NUCLEUS AND PROCESS OF PRODUCING THEM

Ernest Harry Rodd, Timperley, and Gordon Edward Watts, Brighton, England, assignors to Imperial Chemical Industries Limited, a corporation of Great Britain No Drawing. Application September 4, 1931, Serial No. 561,306. In Great Britain September 10, 1930

14 Claims. (Cl. 260—38)

The present invention relates to the manufacture of new basic dyestuffs, particularly of new basic dyestuffs of the polymethine series which may be represented by the general formula $$A-CH=CH-B$$

wherein A is the residue of a 5-pyrazolone body, the point of attachment being position 4, and B represents the residue of a heterocyclic compound of the type

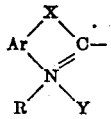

wherein Ar is an o-arylene radical, R is an alkyl or substituted alkyl group, Y is a salt-forming radical, such as chlorine, and X represents an oxygen atom, a sulphur atom, a dialkylmethylene group, or a vinylene radical ($-CH=CH-$). It is an object of the invention to provide new basic dyestuffs of the type mentioned.

Such dyestuffs are made according to the present invention by either of the reactions represented by the following two equations:

(1) $A=CH-NHR'+CH_3-B$ (or $CH_2=B$) →
 $A-CH=CH-B+NH_2R'$ (2) $A-H+Z-CH=CH-B$ →
 $A-CH=CH-B+HZ$

In these equations A and B have the significance mentioned above, R' is a hydrocarbon substituent, Z is a univalent replaceable element or group, such as for example, halogen, hydroxyl, alkoxyl, amino, alkylamino or arylamino group.

In carrying out the invention condensation is effected for example between 4-anilinomethylene-1-phenyl-3-methyl-5-pyrazolone and 1,3,3-trimethyl-2-methyleneindoline or 2-methyl-1:3:3-triethyl-indoleninium iodide

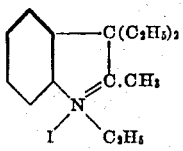

or between 1-phenyl-3-methyl-5-pyrazolone and the compound probably to be named 3:3-dimethyl-2-anilinovinylindolenine methiodide or an acyl derivative thereof. A valuable orange dyestuff is thus obtained.

Instead of 4-anilinomethylene-1-phenyl-3-methyl-5-pyrazolone we may use a substituted derivative thereof, such as are obtained by Dains and Brown (Journal of the American Chemical Society, 1909, Vol. XXXI, pages 1148 to 1157). These derivatives are formed by the interaction of a diaryl-formamidine and a methyl-phenyl-pyrazolone or a diphenyl-pyrazolone. They include the reaction products of 1-phenyl-3-methyl-5-pyrazolone and the following substituted formamidines: diphenyl-formamidine, di-alpha-naphthyl-formamidine, di-para-brom-diphenyl-formamidine, di-para-tolyl-formamidine, di-ψ-cumyl-formamidine and di-para-phenetyl-formamidine. Also included are the reaction products of 1-3-diphenyl-5-pyrazolone and the following substituted formamidines: diphenyl-formamidine, di-ortho-tolyl-formamidine, and di-beta-naphthyl-formamidine. Similarly instead of 3,3-dimethyl-2-anilinovinylindolenine methiodide we may use such analogously constituted compounds and derivatives as are described in British specification 344,409. These compounds and derivatives are formed by the interaction of a diaryl-formamidine and a heterocyclic nitrogen compound. Included are 2 - ω -acetanilido-vinyl-benzoxazole-ethiodide, 2 - ω-acetanilido-vinyl - benzothiazole-ethiodide, anilino-vinyl-quinoline-ethiodide.

Also in place of 1,3,3-trimethyl-2-methyleneindoline we may use other heterocyclic compounds containing reactive external methylene groups, and in place of the particular pyrazolone we have mentioned, we may use other pyrazolones.

The invention is illustrated, but not limited, by the following examples, in which the parts are by weight.

Example 1

A mixture consisting of 2.75 parts of 4-anilinomethylene-1-phenyl-3-methyl - 5 -pyrazolone and 1.73 parts of 1,3,3-trimethyl-2-methylene-indoline is agitated and heated at 130° C. for 2 hours. After cooling, the crude melt is recrystallized from alcohol. The product is obtained, as a base, in the form of orange-red crystals.

We convert the product into a hydrochloride by dissolving it in concentrated hydrochloric acid and adding a small quantity of water; the hydrochloride is precipitated as a yellow crystalline substance. When treated with excess of water the hydrochloride is decomposed with regeneration of the original base.

Our new dyestuff as hydrochloride, dyes wool, natural silk, and tannin mordanted cotton in bright orange shades from an acid bath. The free base has affinity for cellulose acetate, which it dyes a brilliant orange shade.

Example 2

A mixture consisting of 2.77 parts of the equimolecular condensation product of 1:2:3:3-tetramethylindoleninium iodide and diphenylformamidine, described in British specification 344,409, and 1.74 parts of 1-phenyl-3-methyl-5-pyrazolone is melted and maintained at 150° C. for one hour. The cooled melt is digested with excess of 5% hydrochloric acid and filtered. The residue is washed with water and recrystallized from alcohol. The product is the dyestuff base identical with that obtained in Example 1.

Example 3

In Example 1 the 1,3,3-trimethyl-2-methylene indoline may be replaced by 7-methoxy-1,3,3-trimethyl-2-methylene-indoline (2.03 parts). The condensation is carried out as described in Example 1, and the resulting color base dyes acetate silk in deep orange shades.

The base forms a hydrochloride which is stable only in acid solution from which it dyes natural silk, wool and tanned cotton in bright orange-red shades.

Example 4

A mixture of 15 parts of quinaldine ethiodide, 10 parts of potassium acetate, 17 parts of 4-anilinomethylene-1-β-naphthyl-3-methyl-5-pyrazolone, all the ingredients being powdered, is heated with stirring at 150° C. for about half-an-hour. The molten mass solidifies on cooling and is crushed and dissolved in industrial ethyl alcohol. Enough hydrochloric acid is added to precipitate all the dyestuff as the hydrochloride. This is filtered off and purified if necessary by recrystallization from alcoholic hydrochloric acid. The product is similar to that of Example 1.

4-anilinomethylene-1-β-naphthyl-3-methyl-5-pyrazolone is obtained by interaction of diphenylformamidine and 1-β-naphthyl-3-methyl-5-pyrazolone.

It is evident that our invention has a wide application. The pyrazolone residue A may contain in positions 1 and 3 any relatively inactive substituent group, such for example, as alkyl, aryl or substituted aryl. The residue B may be the residue of either the ammonium salt or the corresponding methylene base derived from a benzoxazole, a benzthiazole, a 3,3'-dialkylindoline or quinoline. A great variety of new basic dyes having valuable dyeing properties is thus obtainable.

As many apparently widely different embodiments of this invention may be made without departing from the spirit and scope thereof, it is to be understood that we do not limit ourselves to the specific embodiments thereof except as defined in the appended claims.

We claim:

1. Polymethine dyes having the following general formula:

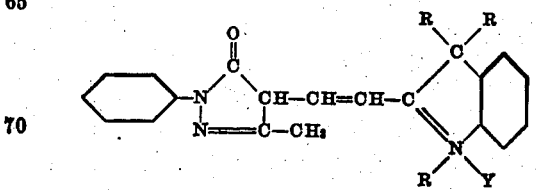

wherein R represents an alkyl group, and Y represents a halogen group.

2. A polymethine dye having the following general formula:

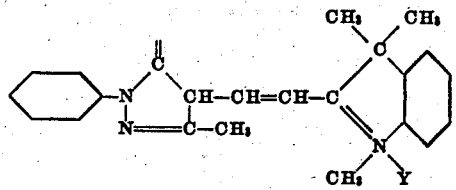

wherein Y represents a halogen group.

3. A process for producing a polymethine dyestuff, which comprises condensing a pyrazolone compound of the general formula:

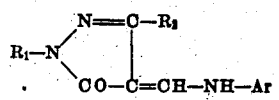

wherein $R_1$ stands for a phenyl or naphthyl radical, $R_2$ for an alkyl or phenyl radical, and Ar for a radical of the benzene or naphthalene series, with a compound selected from the group consisting of the free base and hydrohalides of a compound which in basic form has the general formula:

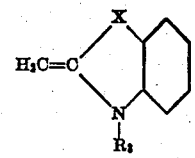

wherein $R_3$ is an alkyl radical, while X is a bivalent radical of the series consisting of oxygen, sulfur, dialkylmethylene or vinylene.

4. The process of producing a polymethine dyestuff, which comprises heating a pyrazolone compound of the general formula

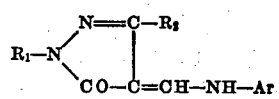

wherein $R_1$ stands for a phenyl or naphthyl radical, $R_2$ for an alkyl or phenyl radical, and Ar for a radical of the benzene or naphthalene series, with a compound of the general formula

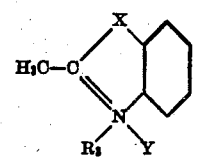

wherein $R_3$ stands for an alkyl radical, Y stands for halogen, while X stands for a bivalent radical of the series consisting of oxygen, sulfur, vinylene, and dialkyl-methylene.

5. The process of producing a polymethine dyestuff, which comprises heating a pyrazolone compound of the general formula

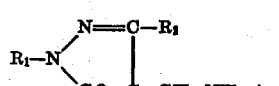

wherein $R_1$ stands for a phenyl or naphthyl radical, $R_2$ for an alkyl or phenyl radical, and Ar for a radical of the benzene or naphthalene series, with a compound of the general formula

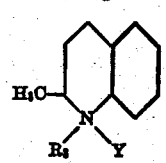

wherein R₃ stands for an alkyl radical, while Y stands for a halogen atom.

6. A process for producing a dyestuff of the polymethine series, which comprises heating 4-anilinomethylene-1-phenyl-3-methyl-5-pyrazolone with a 1,3,3-trimethyl-2-methylene-indoline.

7. A process as in claim 6, the heating being followed by acidification with hydrochloric acid, to convert the dyestuff into its hydrochloride.

8. A process for producing a dyestuff of the polymethine series, which comprises heating 4 - anilinomethylene-1-β-naphthyl-3-methyl-5-pyrazolone with quinaldine-ethiodide.

9. A process as in claim 8, the heating being followed by acidification with hydrochloric acid, to convert the dyestuff into its hydrochloride.

10. A dyestuff which in the form of its hydrohalide corresponds to the general formula

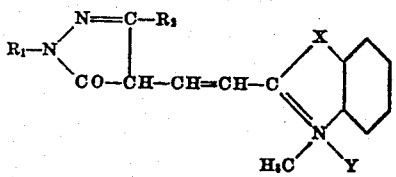

wherein R₁ stands for an aryl radical of the benzene or naphthalene series, R₂ stands for an alkyl or phenyl radical, Y stands for halogen, while X stands for a bivalent link of the group consisting of oxygen, sulfur, vinylene and dialkylmethylene.

11. A dyestuff which in the form of its hydrohalide corresponds to the general formula

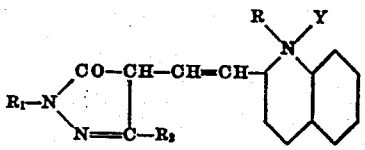

wherein R₁ stands for an aryl radical of the benzene or naphthalene series, R₂ stands for an alkyl or phenyl radical, R stands for an alkyl radical, while Y stands for halogen.

12. A dyestuff which in the form of its hydrohalide corresponds to the general formula

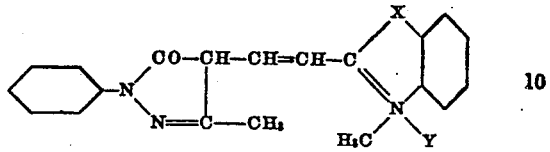

wherein X stands for oxygen, sulfur, dialkylmethylene, or vinylene, while Y stands for halogen.

13. A dyestuff which in the form of its hydrochloride corresponds to the general formula

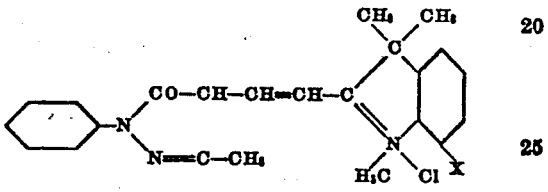

wherein X stands for H or OCH₃.

14. A dyestuff which in the form of its hydrochloride corresponds to the general formula

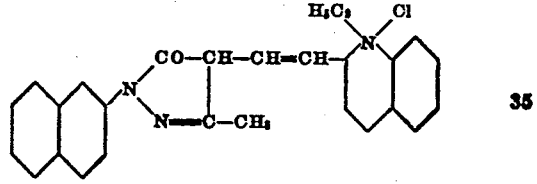

ERNEST HARRY RODD.
GORDON EDWARD WATTS.

CERTIFICATE OF CORRECTION.

Patent No. 2,032,502.  March 3, 1936.

ERNEST HARRY RODD, ET AL.

It is hereby certified that error appears in the printed specification of the above numbered patent requiring correction as follows: Page 2, second column, line 5, claim 2, first "C" in first part of the formula, insert the letter O over the double bond; page 3, second column, line 25, claim 13, in the formula, insert a bond between the first "CH" and the "C" below; and that the said Letters Patent should be read with these corrections therein that the same may conform to the record of the case in the Patent Office.

Signed and sealed this 12th day of May, A. D. 1936.

Leslie Frazer
(Seal)
Acting Commissioner of Patents.